United States Patent
Brooke

Patent Number: 5,917,308
Date of Patent: Jun. 29, 1999

[54] SYSTEM AND METHOD FOR CONTROLLING EXCESSIVE CHARGING-CURRENT IN A BATTERY POWER SYSTEM

[75] Inventor: John Christopher Brooke, Dallas, Tex.

[73] Assignee: Lucent Technologies Inc., Murray Hill, N.J.

[21] Appl. No.: 08/929,246

[22] Filed: Sep. 10, 1997

[51] Int. Cl.⁶ .......................... H01M 10/46; H01M 10/44
[52] U.S. Cl. ............................ 320/118; 320/119; 320/136
[58] Field of Search ...................... 320/118, 119, 320/122, 125, 132, 136, FOR 105, FOR 114, FOR 116, FOR 121, DIG. 21

[56] References Cited

U.S. PATENT DOCUMENTS 4,238,721   12/1980   DeLuca ................................... 320/122

*Primary Examiner*—Edward H. Tso

[57] ABSTRACT

A system and method for controlling excessive charging of batteries in battery power plants and power systems. A system embodiment includes: a battery plant for supplying power to a load, and incorporates one or more of the following: a power supply, a battery string (with at least one battery), and a controller. The power supply(s) is used to charge a battery string(s) having at least one battery. The controller is coupled to the battery string(s) and the power supply(s). The controller is configured to: (1) sense whether the battery string is receiving an excess current independent of current to a load by comparing current flowing to the battery string to a preset current limit, (2) dynamically adjust the current limit to eliminate any excess current detected in the battery string if an excess current is detected, and (3) increase the current limit to charge the battery string when no excess current is detected.

10 Claims, 2 Drawing Sheets

SYSTEM AND METHOD FOR CONTROLLING EXCESSIVE CHARGING-CURRENT IN A BATTERY POWER SYSTEM

BACKGROUND OF THE INVENTION

1. Field of the Invention

The present invention relates generally to power systems, and more specifically, to a system and method of regulating charging current to batteries in a battery power-plant.

2. Background Art

Users have become increasingly reliant upon electronic systems to perform critical functions. Some electronic systems must be operational at all times. For instance, telecommunication systems, such as switching systems and cellular stations, must handle thousands of calls per second. The failure of such systems due to power loss, is unacceptable since it would result in the loss of millions of telephone calls and the severe disruption of commerce.

Critical electronic systems typically rely on battery plants to maintain a high level of constant operational availability. Battery plants employ backup batteries to provide power when a commercial (or non-commercial) power supply is off-line or unavailable; especially in rural areas. It is therefore, necessary to keep batteries charged prior to a power outage or recharge batteries following a power unavailability to avoid depleting battery reserves.

In many applications, such as cellular, it is necessary to charge batteries as rapidly as possible to regain battery storage reserves in advance of further power source unavailability. To charge batteries in shorter periods of time, it is necessary to raise their voltage to a higher level, which can result in excessive current flowing to the batteries. Excessive charging current can physically damage batteries reducing their effective life or destroy them. Additionally, excessive charging currents cause batteries to "out gas" giving off quantities of toxic gasses, which present severe health, environment and safety concerns.

To prevent excess charge currents most sophisticated power supplies have some type of static current limit control to provide protection from excessive current during abnormal conditions, such as a short circuit in the connected equipment (load). Such a static current limit control is typically set manually to a desired level and left unchanged. During normal conditions the load draws less current than the current limit setting of the power supply and the supply functions as constant voltage source. During abnormal conditions when the load requires more current than the current limit setting, the current limit becomes active restricting the current to the load (i.e., the power supply functions as a constant current source). In the latter case, when the load requires more energy, it is possible to starve the batteries, since current from the power supply is limited.

Additionally, if a power plant with static current limit control is modified, for instance, to include more batteries, it is necessary to manually change the current limit setting. Such modifications may require hardware changes as well as possible design changes to the system, which is costly and restrictive.

Further, it is sometimes desirous to remove the load during low voltage conditions. However, static current limit sensors are designed to assume that a load current is always present. Accordingly, when the load current is removed, it is possible to allow excessive current to reach the batteries and possibly damage or destroy them, since the current flowing from the power source is assumed to include a load component, which is absent in this scenario.

Thus, what is a needed is an improved power plant design with a less restrictive current control schemes, able to dynamically account for variations in load current while protecting the batteries from excess charging current.

SUMMARY OF THE INVENTION

The present invention is directed to a system and method for controlling excessive charging-current in a battery power system.

In a system embodiment, the system includes: a battery string having at least one battery, one or more power supplies, coupled to the battery string, configured to supply a current to the battery string and a load. The power supply has a current limit. The system also includes: a controller, coupled to the battery string and the power supply(s) and is configured to: (1) sense whether the battery string is receiving an excess current by comparing the current flowing in the battery string to a maximum current level, (2) decrease the current limit in an iterative fashion if the current flowing in said battery string exceeds the maximum current level, until the current flowing in the battery string no longer exceeds the maximum current level, and (3) increase the power supply current limit to charge the battery strings.

The present invention permits the power system current limit to be adjusted dynamically, which prevents a battery (and/or batteries) from being starved while the load current increases. By increasing and decreasing the current limit in an iterative fashion, the present invention permits a battery to be charged at safer, more controlled levels. Thus, the present invention increases battery life, safety and reduces environmental risks.

Still another feature of the present invention, is the ability to safely increase current to the battery (and/or batteries), when it is detected that it is no longer drawing excess current. Accordingly, the current limit is increased in an iterative fashion until the battery reaches a safe charging level and are not drawing excess current. At this point, the current limit is reset to the initial level and the power supply resumes normal operation.

Furthermore, the present invention permits the flexibility of removing the load without running the risk of sending excessive current to the battery(s), because the current limit measurements are focused on the battery string(s) in particular.

Other features and advantages of the present invention will become apparent after reading the foregoing description.

In the figures, arrows between elements denote paths linking signals and/or information. Such paths may be a bus, wire, optic fiber and the like in hardware applications or a logical connection for the transfer of information in software applications or a combination in hybrid hardware/software systems.

DETAILED DESCRIPTION OF THE INVENTION

Figure 1:
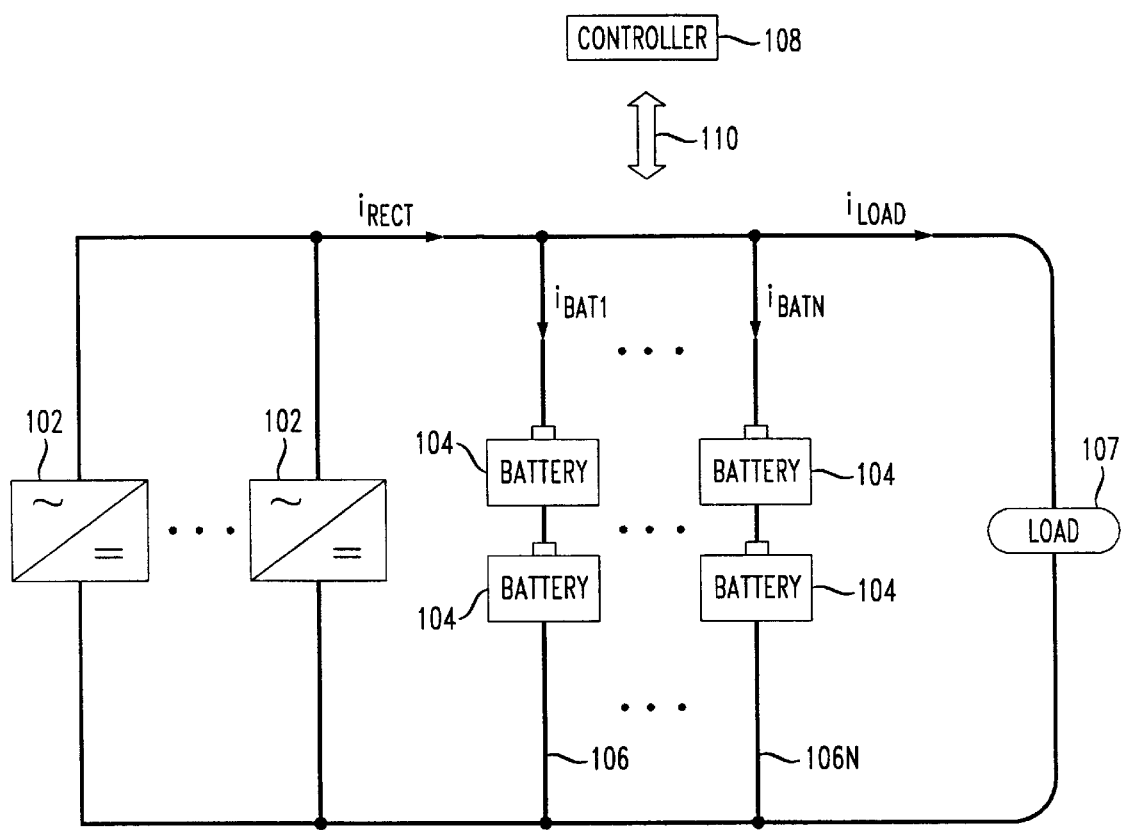
FIG. 1 is a simplified block diagram of a battery plant according to an exemplary embodiment of the present invention.

The present invention is directed to a dynamic system and method for controlling excessive charging current of a battery string(s) in power systems. FIG. 1 is a simplified block diagram of a battery plant power system 100 according to an exemplary embodiment of the present invention.

The system 100 includes: one or more power supplies 102 (in the a one embodiment the power supply(s) is a rectifier), one or more battery strings 106-to-106N including one or more batteries 104, (where N≧1, and stands for the number of battery strings), a load 107, and a controller 108. As shown, the power supplies 102, the batteries 104 and the load 107 are connected in parallel. Rectifier current, $i_{RECT}$, flows from the rectifier(s) 102 to the batteries 104, (referred to as charge current or battery current and shown as $i_{BAT}$) and to the load 107 (referred to as load current and shown as $i_{LOAD}$). The controller 108 is able to measure the rectifier current, the charge current and the load current and based on the measurements adjust the rectifier current, which in turn may affect the charge and load currents. Control and measurement signals are sent and received by the controller via a bus 110. Typically, all measurements are made across shunts (not shown) in the various branches that would indicate rectifier, battery and load current. In the exemplary embodiment the controller 110 is a programmable microprocessor-based device configured to operate in accordance with firmware and/or software instructions in accordance with the operational steps of FIG. 2. However, the controller is not limited to microprocessors and may be an analog controller or any type of programmable logic device, such as a processor, Field Programmable Logic Device, Digital Signal Processor and other related devices. An advantage of the controller 110 is that it can be easily reprogrammed to account for modifications to hardware and/or operating parameters.

Figure 2:
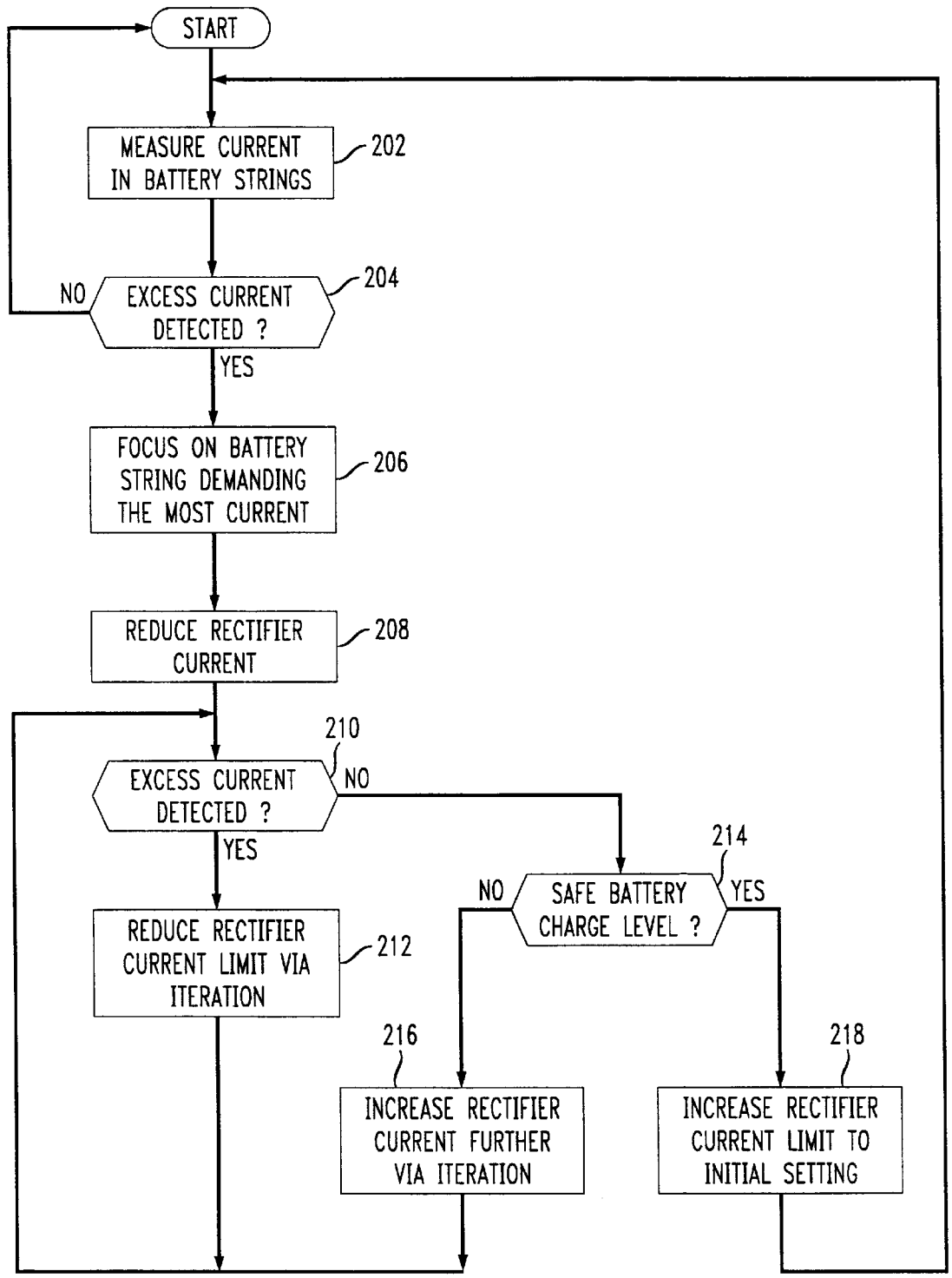
FIG. 2 is flow chart illustrating the operation of a battery plant according to an exemplary embodiment of the present invention.

FIG. 2 is a flow chart illustrating the general operation of system 100, in accordance with an exemplary embodiment of the present invention. The flow chart includes steps 202 through 218, which illustrate a process/method 200 to dynamically adjust currents flowing to the batteries 104 to prevent excessive charge current from damaging the batteries 104. Steps 202 through 208 describe a first attempt of system 100 to eliminate excess current. Steps 210 and 212 address how the system 100 further reduces the charging current, if an excess charging current remains in any of the battery strings 106. Steps 214 through 218, illustrate how the system 100 gradually increases the maximum current level or until it is determined that the batteries 104 reach a safe charge level. At this point, the system 100 returns to normal operation and the maximum current level is reset to the initial maximum current level.

Steps 202 through 218 will now be described in more detail. In step 202, the battery plant power system 100, and in particular the controller 108, measures the charge current, ibat, in each battery string 106. Although not shown, measurements of currents, such as $i_{RECT}$, $i_{BAT}$ and $i_{LOAD}$, occurs in the background throughout steps 202–218.

Next, in a decisional step 204, the controller 108 compares $i_{BAT}$ to a maximum current level value (also referred to as a current limit), stored in memory (not shown) of controller 108. If $i_{BAT}$ in any battery string 106, exceeds the maximum current level value, then according to the "YES" branch of decisional block 204, the system proceeds to step 206. If no excess current exists, then the controller 108 continues to measure the current in the battery strings 106 on a periodic basis to ensure that excess current is not flowing the batteries 104, according to the "NO" branch of decisional step 204.

In step 206, the controller 108 determines which battery string 106 through 106N, is demanding the most current, if there is more than one battery string receiving an excess current. The controller 108 bases all further decisions and calculations in steps 208–218 based on the battery string demanding the most current. In step 208, the controller 108 reduces the maximum current limit (level) by reducing the rectifier current $i_{RECT}$ by the excess amount detected in step 204. In other words, the rectifier current, $i_{RECT}$, is reduced in accordance with equation 1.0:

$$i_{RECT} - i_{excess} = i_{limit\ t} \qquad \text{(eq. 1.0)}.$$

The process 200 now enters an iterative loop. In step 210 if an excess charging current, $i_{BAT}$, is still detected, then according to the "YES" branch, the controller reduces the maximum current limit, $i_{limit\ t}$, further in accordance with equation 1.1:

$$ilimit\ t+1 = i_{limit\ t} - i_{excess} \qquad \text{(eq. 1.1)}$$

where $i_{excess}$ is the amount of excess current detected in step 210. It may take several iterations before the charge current is reduced (by reducing the current, $i_{RECT}$, from rectifiers 102) to a level below the reduced maximum current limit. However, once the charge current, $i_{BAT}$, falls below the modified limit, then according to the "NO" branch of decisional step 210, the controller 108 attempts to produce more current in accordance with steps 214–218. In a decisional step 214, the controller 108, determines whether the batteries 104 are charged to a safe battery-charge-level, where it is possible to increase the rectifier current to normal levels. The controller 108 determines this condition in accordance with equation 1.2:

$$i_{BAT} < i_{charge\ limit} * 75\% \qquad \text{(eq. 1.2)}$$

It is appreciated by those skilled in the art that equation 1.2 in conjunction with step 214 is a safety measure and can easily be modified or eliminated without departing from the scope of the present invention. The rationale behind step 214 will come more apparent as described in more detail below.

In accordance with the "NO" branch of 214, then in step 216 the controller 108 attempts to produce more current by increasing the current limit by a shortage necessary to charge the batteries, where the current is expressed in equation 1.3:

$$i_{limit\ t+1} 32\ i_{limitt} + i_{shortage} \qquad \text{(eq. 1.3)}$$

Once step 214 is completed, decisional steps 210 and 214 are checked again to ensure that (1) the batteries do not start drawing excess current or (2) that the batteries are charge to a level that no longer requires excess charge current. Eventually, the latter condition is reached with batteries 104 demanding less charge current. Under these conditions, the rectifier current is raised with each iteration of steps 210, 214 and 216. It is possible that the controller 108 toggles between step 210, 212, 214 and 216 when it takes time for the batteries to charge without the condition of receiving an excessive current.

Once that condition is met, then in steps 210, 214 and 216 the iteration continues to raise the current limit until one of two conditions are met: (1) the battery are charged to such an extent that their charge current is much less than the maximum limit, or (2) the rectifier current limit is increased to a user defined level. The criteria used for the first condition was described above with reference to equation 1.2. Accordingly, once the charging current has dropped to less than 75% of the maximum allowed charge current, then according to the "YES" branch of decisional step 214, the rectifier current is raised to the initial maximum current limit. The algorithm returns to step 202 until an excess charging current is detected, again. It is also possible to eliminate steps 214 and 216 by simply increasing the rectifier current limit to account for any battery shortages in accordance with step 218.

It should be noted that by adjusting the current limit, it is likely that current to the battery strings may correspondingly be increased or decreased. Thus, in an alternative embodiment it is possible to adjust the current to the battery strings independent of adjusting the current limit.

While exemplary embodiments have been set forth, various modifications, alterations, and changes may be made without departing from the spirit and scope of the present invention as defined in the specification and in the appended claims.

What is claimed is:

1. A system, comprising:
    (a) a battery string demanding a maximum current level, said battery string having at least one battery;
    (b) at least one power supply, coupled to said battery string, configured to supply a current to said battery string and a load, said power supply having a current limit;
    (c) a controller, coupled to said battery string and said at least one power supply, configurable to: (1) sense whether said battery string is receiving an excess current by comparing current flowing in said battery string to said maximum current level, (2) decrease said power supply current limit in an iterative fashion if said current flowing in said battery string exceeds said maximum current level, until said current flowing in said battery string no longer exceeds said maximum current level, and (3) increase said power supply current limit to charge said battery string, said controller capable of dynamically adjusting said power supply current limit to said battery string.

2. The system of claim 1, comprising a plurality of parallel-coupled battery strings, wherein said controller dynamically adjusts said power supply current limit based on said battery string demanding said maximum current level.

3. The system of claim 1, wherein said controller is further configured to increase said power supply current limit in an iterative fashion, when said current flowing in said battery string no longer exceeds said maximum current level.

4. A power system for controlling excessive charging currents to batteries while being charged, comprising:
    (a) a battery string demanding a maximum current level, said battery string having at least one battery;
    (b) at least one power supply, coupled to said battery string, configured to charge said battery and supply power to a load by supplying a current to said battery string and said load; and
    (c) a controller, coupled to said battery string and said at least one power supply configured to:
        (aa) adjust current produced by said at least one power supply to prevent said battery string from receiving a current that exceeds a maximum current level while said battery string is charging;
        (bb) if said current continues to exceed said maximum current level, further reduce said current produced by said at least one power supply by an amount X in an iterative fashion, until said current falls below said maximum current level, wherein X is a number greater than zero, said controller capable of dynamically adjusting said power supply current limit to said battery string.

5. The power system of claim 4, wherein said controller is further configured to increase said current produced by said at least one power supply by an amount N, in an iterative fashion, while ensuring that said battery string does not receive a current in excess of said maximum current level, wherein N is a number greater than zero.

6. The power system of claim 4, wherein said controller is further configured to increase power produced by said at least one power supply to a safe operating level, if said battery string does not receive a current in excess of said maximum current level.

7. The power system of claim 6, wherein said controller is further configured to increase said current produced by said at least one power supply by an amount substantially equal to any shortage necessary to charge said battery string.

8. A method for preventing excessive current from flowing into a battery string demanding a maximum current level, said battery string having at least one battery, comprising:
    (a) measuring current flowing to said battery string;
    (b) determining whether said current exceeds a predetermined level;
    (c) decreasing a rectifier current, by a factor N in an iterative fashion until said current flowing to said battery string is less than said predetermined level, wherein N is any number greater than zero; and
    (d) increasing said rectifier current in an iterative fashion, by a factor M, until said rectifier current reaches a maximum level and said current flowing to said battery string is less than said predetermined level, wherein M is any number greater than zero.

9. The method of claim 8, further comprising decreasing and increasing said rectifier current limit.

10. A method for controlling charge current to a plurality of battery strings, comprising:
    (a) determining whether a current is a maximum current by measuring said current in each of said plurality of battery strings;
    (b) comparing said maximum current to a current limit level;
    (c) if excess current is detected, reducing a rectifier current limit by an amount X, wherein X is a number greater than zero;
    (d) comparing whether said rectifier current limit to said battery strings exceeds said current limit level, in any battery string;
    (e) if excess current to one or more of said battery strings is detected according to step (d), then reducing said rectifier current limit in an iterative fashion, by a factor N, until said current in one or more of said battery strings is less than said current limit level, wherein N is a number greater than zero; and
    (f) increasing said rectifier current limit in an iterative fashion, by a factor M, until the current flowing to said battery strings substantially reaches a safe charge level, wherein M is a number greater than zero.

* * * * *